US012757819B1

(12) United States Patent
Grove et al.

(10) Patent No.: US 12,757,819 B1
(45) Date of Patent: Oct. 13, 2026

(54) SYSTEMS AND METHODS FOR RETROFITTING PUSH LAWN EQUIPMENT FOR AUTONOMOUS OR SEMI-AUTONOMOUS CONTROL

(71) Applicant: Board of Trustees of the University of Alabama, for and on behalf of the University of Alabama in Huntsville, Huntsville, AL (US)

(72) Inventors: Gavyn Grove, Madison, AL (US); Joseph Martin, Cullman, AL (US); Matthew L'Antigua, Huntsville, AL (US); Rahul Rameshbabu, Madison, AL (US); Tyler Oliger, Huntsville, AL (US); Farbod Fahimi, Owens Crossroads, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 795 days.

(21) Appl. No.: 17/847,119

(22) Filed: Jun. 22, 2022

Related U.S. Application Data

(63) Continuation-in-part of application No. 16/272,814, filed on Feb. 11, 2019, now Pat. No. 11,483,967.
(Continued)

(51) Int. Cl.
*A01D 34/81* (2006.01)
*A01D 34/00* (2006.01)
(Continued)

(52) U.S. Cl.
CPC ........... *A01D 34/008* (2013.01); *A01D 34/81* (2013.01); *A01D 69/02* (2013.01); *A01D 34/68* (2013.01); *A01D 2101/00* (2013.01)

(58) Field of Classification Search
CPC .............................. A01D 34/008; A01D 34/81
See application file for complete search history.

(56) References Cited

U.S. PATENT DOCUMENTS 3,800,902 A 4/1974 Keller
3,924,389 A 12/1975 Kita
(Continued)

FOREIGN PATENT DOCUMENTS

DE 102009027557 A1 * 1/2011 ............. A01B 33/16

OTHER PUBLICATIONS

Grove, et al., U.S. Appl. No. 16/272,814 entitled, "Method of Conversion to Automated Lawn Mower," filed Feb. 11, 2019.

*Primary Examiner* — Alicia Torres
(74) *Attorney, Agent, or Firm* — Butler Snow, LLP; Jon E. Holland

(57) ABSTRACT

Push lawn equipment, such as a push lawn mower, snow blower, or leaf blower or vacuum, is connected to a retrofit assembly having a support frame. The support frame is connected to wheels and at least one motor for driving the wheels to move the support frame and, hence, the lawn equipment under autonomous or semi-autonomous control. The support frame is adaptable to accommodate lawn equipment of various sizes and configurations, and since the support frame has its own drive system for motion, the retrofit assembly does not need to be recalibrated for different types of lawn equipment. Accordingly, at a relatively low cost, any of a wide variety of existing items of lawn equipment can be retrofitted with an assembly that provides autonomous or semi-autonomous control of the item of lawn equipment.

15 Claims, 10 Drawing Sheets

Related U.S. Application Data

(60) Provisional application No. 62/628,694, filed on Feb. 9, 2018.

(51) Int. Cl.

*A01D 69/02* (2006.01)
*A01D 34/68* (2006.01)
*A01D 101/00* (2006.01)

(56) References Cited

U.S. PATENT DOCUMENTS

| | | | | |
|---|---|---|---|---|
| 4,318,266 | A | 3/1982 | Taube | |
| 4,694,639 | A | 9/1987 | Chen | |
| 7,677,344 | B2 * | 3/2010 | Medina | A01D 69/02 180/65.285 |
| 10,888,046 | B2 | 1/2021 | Gorenflo et al. | |
| 2003/0144774 | A1 | 7/2003 | Trissel | |

* cited by examiner

SYSTEMS AND METHODS FOR RETROFITTING PUSH LAWN EQUIPMENT FOR AUTONOMOUS OR SEMI-AUTONOMOUS CONTROL

RELATED ART

This application is a continuation-in-part of and claims priority to U.S. patent application Ser. No. 16/272,814, entitled "Automated Lawn Mower" and filed on Feb. 11, 2019, which is incorporated herein by reference. U.S. application Ser. No. 16/272,814 claims priority to U.S. Provisional Application No. 62/628,694, entitled "Remote Controlled Lawn Mower" and filed on Feb. 9, 2018, which is incorporated herein by reference.

RELATED ART

Mowing lawns is often a long, burdensome, and unpleasant experience that must be repeated with frequency to maintain an attractive property and conform to many local ordinances. In an effort to solve this problem, autonomous lawn mowers have been developed for automatically mowing lawns without requiring a user to push or ride the lawn mowers. In some cases, control of a lawn mower is completely autonomous such that the lawn mower automatically controls its speed, direction, and mowing pattern during operation. In other cases, the lawn mower may be semi-autonomous where the lawn mower automatically propels itself without requiring the user to manually push or ride the lawn mower. In such cases, the user may control various aspects of the lawn mower's operation via remote control, such as the lawn mower's speed and direction.

Unfortunately, existing autonomous lawn mowers suffer from various disadvantages. In this regard, autonomous lawn mowers can be expensive. Further, many autonomous lawn mowers are relatively small and only cut a small amount or depth of grass. Thus, they often must be run more frequently leading to greater wear of the equipment and increasing the burden on users who must set up, monitor, and/or control the lawn mowers. Thus, a heretofore unaddressed need exists in the art for autonomous or semi-autonomous lawn mowers that are less expensive and relatively simple to operate. It is generally desirable for the cutting performance of such lawn mowers to rival existing push mowers so that lawns can be maintained as desired with less frequent mowing operations relative to existing autonomous lawn mowers.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
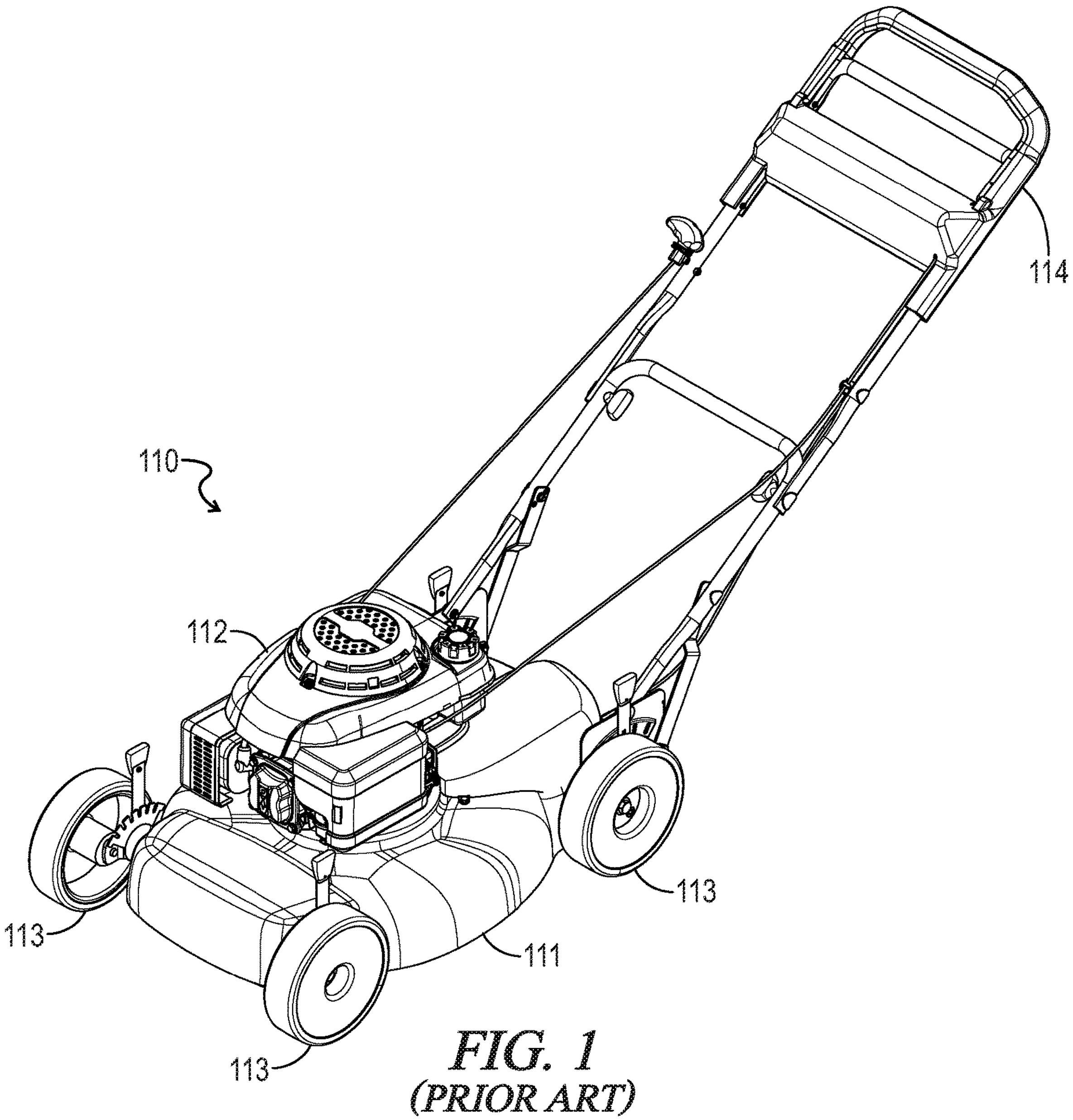
FIG. 1 (PRIOR ART)
FIG. 1 is a diagram illustrating a conventional push lawn mower.

Embodiments of the present disclosure generally pertain to systems and methods for retrofitting push lawn equipment, such as lawn mowers, snow blowers, leaf blowers or vacuums, for autonomous or semi-autonomous control. As used herein, "push lawn equipment" generally refers to lawn equipment that is manually pushed by a user for use in servicing or maintaining a yard or driveway, such as a lawn mower for cutting grass or a snow or leaf blower for blowing snow or leaves. In some embodiments of the disclosure, a system for retrofitting push lawn equipment has a retrofit assembly comprising a support frame that is connected to a plurality of wheels for allowing movement of the frame. In this regard, one or more of the wheels is connected to one or more motors that rotate the connected wheels to move the frame in a desired direction. Further, an item of push lawn equipment, such as a lawn mower, leaf blower, or snow blower, is connected to the frame so that the push lawn equipment is moved with the frame in an autonomous or semi-autonomous fashion.

As used herein "autonomous" generally refers to lawn equipment that is configured to move in response to forces generated by components of the lawn equipment without requiring a user to exert force (i.e., push or pull) on the lawn equipment. Lawn equipment is completely autonomous when the lawn equipment has sufficient intelligence to control the velocity (e.g., direction and speed) of the lawn equipment without a user providing real-time inputs. "Semi-autonomous" generally refers to lawn equipment that is otherwise autonomous except that a user remotely controls the speed and/or direction with real-time inputs (e.g., steers movement of the lawn equipment).

In some embodiments, an item of lawn equipment is connected to the support frame by removing one or more wheels of the item and connecting the item to the frame at a point where the removed wheel was previously connected to the item. Using the wheels of the support frame rather than the removed wheels of the item of lawn equipment for motion helps to ensure precise and consistent movement of the system regardless of the condition and arrangement of wheels originally used by the item of lawn equipment. As an example, the system may be steered by differential driving the wheels of the retrofit assembly. Thus, the system does not need to be recalibrated for different types of lawn equipment that may have different wheel sizes and wheel separation distances. That is, the drive system of the retrofit assembly can be appropriately calibrated and used to move the support frame (and, hence, the item of lawn equipment connected to it) in a precise and predictable manner regardless of the type of lawn equipment that is connected to the support frame. To accommodate lawn equipment items of different sizes, the support frame may have one or more movable components that can be adjusted based on the size of the item of lawn equipment being coupled to it.

Accordingly, at a relatively low cost, any of a wide variety of existing items of lawn equipment can be retrofitted with a retrofit assembly that is moved under autonomous or semi-autonomous control. Since the retrofit assembly does not need to be recalibrated based on the type of lawn equipment connected to it, the process of retrofitting the item of lawn equipment is facilitated. In addition, since the existing item of lawn equipment will be used to perform its intended function, such as cutting grass or blowing snow or leaves, the retrofit assembly does not need to include components for performing such function (e.g., a blade of a lawn mower, an engine for turning the blade, a housing for the blade, etc.). This not only helps to keep the cost of the retrofit assembly low, but it also allows the item of lawn equipment to be retrofitted for autonomous or semi-autonomous control without a reduction in cutting or blowing performance.

For illustrative purposes, an exemplary system for retrofitting an item of push lawn equipment for autonomous or semi-autonomous control will be described in the context of use with a lawn mower. However, it should be emphasized the same or similar system may be used via the same or similar techniques to retrofit other types of push lawn equipment, such as a snow blower or a leaf blower.

FIG. 1 depicts a typical push lawn mower 110. The lawn mower 110 of FIG. 1 has a housing 111 on which an engine 112 is mounted. The housing 111 is coupled to a cutting blade (not shown in FIG. 1) that is rotated by the engine 112 in order to cut grass as known the art. The lawn mower 110 has four wheels 113 and a push bar 114 that is pushed or pulled by a user in order to move the lawn mower 110. The lawn mower 110 shown by FIG. 1 is "bagless" in that the cut grass may be mulched by the lawn mower 110 without the use of a bag for catching cut blades of grass. It is, however, possible for the lawn mower 110 to have a bag for catching blades of grass cut by the lawn mower 110. Note that the engine 112 may be electric or alternatively powered by gas or other fuel or power source or a combination of fuel or power sources.

Figure 2:
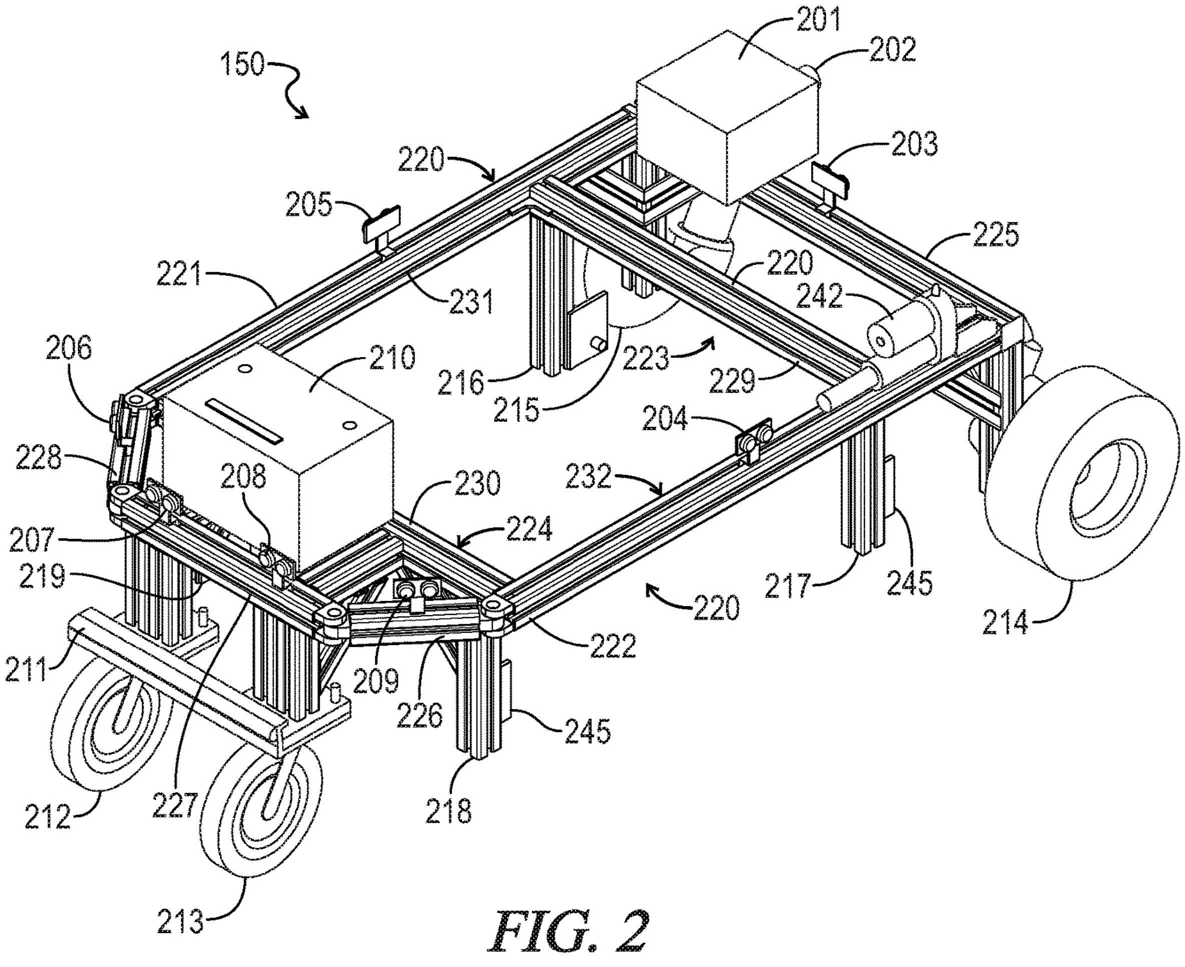
FIG. 2 is a diagram illustrating an exemplary embodiment of a retrofit assembly for retrofitting push lawn equipment for autonomous or semi-autonomous control.

FIG. 2 depicts an exemplary embodiment of a retrofit assembly 150 that may be connected to the lawn mower 110 in order to provide autonomous or semi-autonomous control. As shown by FIG. 2, the retrofit assembly 150 has a support frame 220 for retrofitting a push lawn mower 110. The support frame 220 comprises a plurality of interconnected support elements 221-228. In the embodiment shown by FIG. 2, each support element 221-228 comprises at least one bar composed of a high strength material such as aluminum, steel, or titanium, but other types of support elements may be used in other embodiments. More specifically, in FIG. 2, the support frame 220 has a pair of horizontal support elements 221, 222 that are generally parallel to each other. At the back of the support frame 220, ends of the horizontal support elements 221, 222 are connected by at least one horizontal support element 225. At the front of the support frame 150, ends of the horizontal support elements 221, 222 are connected by the horizontal support element 224.

As shown by FIG. 2, a support element 224 has a pair of vertical arms 218, 219 that extend downward (in the y-direction) from a horizontal bar 230 near the front of the retrofit assembly 150. Each vertical arm 218, 219 may be connected to the lawn mower 110, as will be described in more detail below.

The frame 20 also has an adjustable support element 223 that can be moved relative to other components of the frame 220 in order to accommodate a size of the lawn mower 110 being connected to the retrofit assembly 150. In this regard, the support element 223 has a horizontal bar 229 that extends between the support elements 221, 222. The support element 221 has a groove 231 running along a length of the support element 221, and the support element 222 similarly has a groove 232 (not visible in FIG. 2) that runs along a length of the support element 222. An end of the horizontal support element 229 is inserted into the groove 231 of support element 221 and is guided by the groove 231 as the adjustable support element 223 moves horizontally along the x-direction. Similarly, the opposite end of the horizontal bar 229 is inserted into the groove 232 of support element 222 and is guided by the groove 232 as the adjustable support element 223 moves horizontally along the x-direction. Thus, the adjustable support element 223 can be moved by hand away from or toward the front or back of the support frame 220 along the x-direction such that the support element 229 slides along the support elements 221, 222 along the grooves 231, 232.

As shown by FIG. 2, the adjustable support element 223 has a pair of vertical arms 216, 217 that extend downward (in the y-direction) from the horizontal bar 229. That is the adjustable support element 223 is essentially U-shaped, though other shapes of the support element 223 are possible. As will be described in more detail below, each vertical arm 216, 217 may be connected to the lawn mower 110. Thus, the lawn mower 110 may be connected to the frame 220 at four points (each of the vertical arms 216-219). Further, by sliding the adjustable support element 223 through the grooves 231, 232, the vertical arms 216, 217 may be moved toward or away from the vertical arms 218, 219 in order accommodate the size of the lawn mower 110. As an example, the vertical arms 218, 219 may be connected to a pair of connection points on the lawn mower 110, and the adjustable support element 223 may be moved relative to the rest of the frame 220 so that the vertical arms 216, 217 are aligned with two other connection points on the lawn mower 110, thereby enabling the vertical arms 216, 217 to be connected to these other two connection points.

Figure 4:
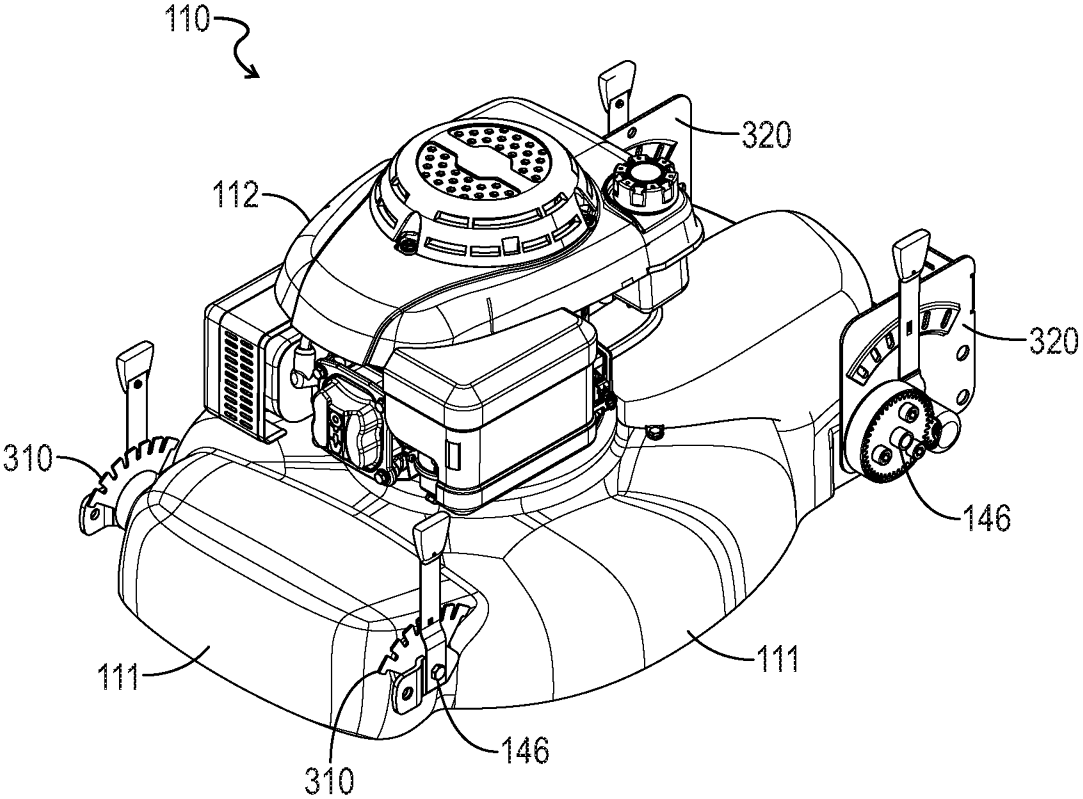
FIG. 4 (PRIOR ART)
FIG. 4 is a diagram illustrating the push lawn mower of FIG. 1 after a push bar and wheels have been removed.
Figure 5:
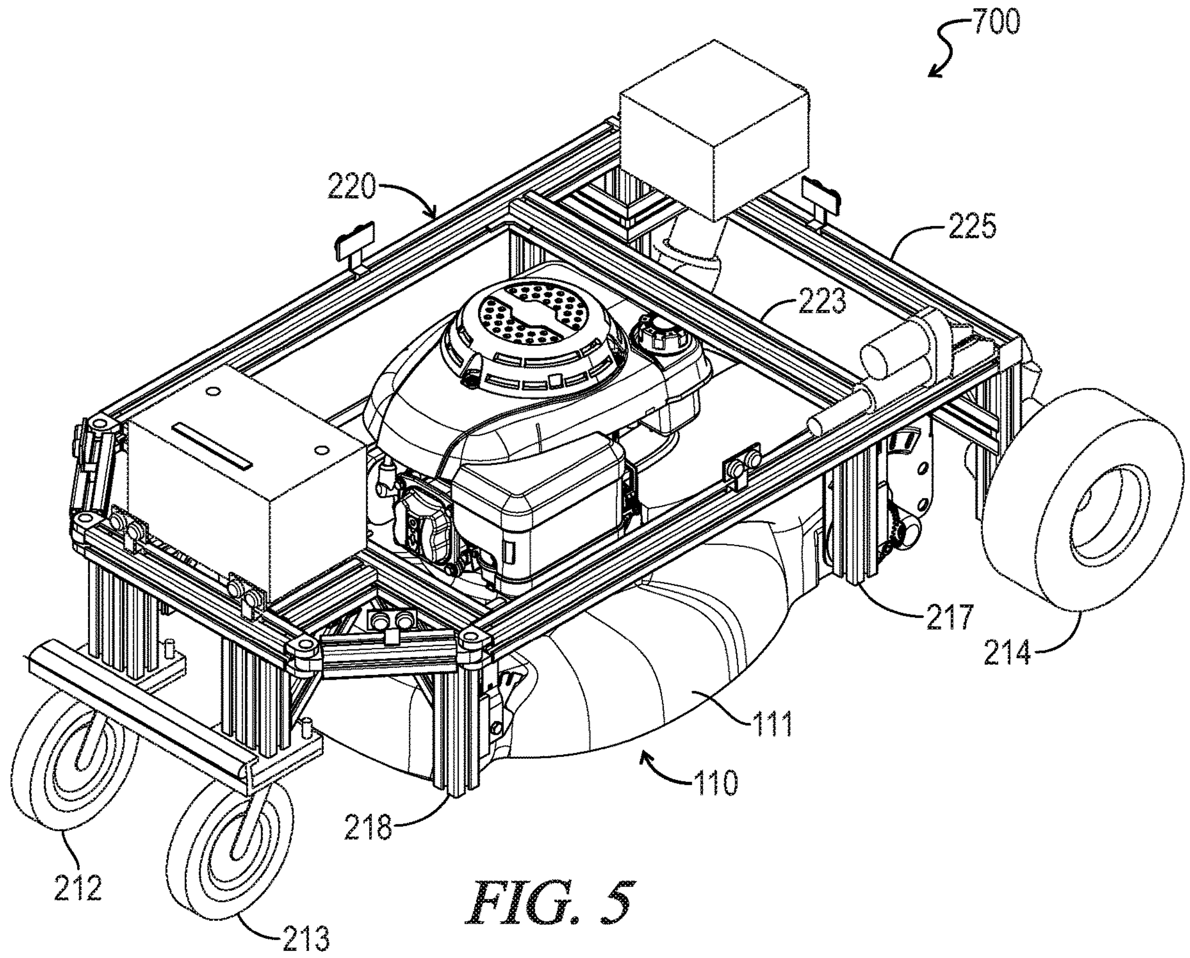
FIG. 5 is a diagram illustrating a retrofitted lawn mower system comprising the retrofit assembly of FIG. 2 connected to the push lawn mower of FIG. 4.
Figure 6:
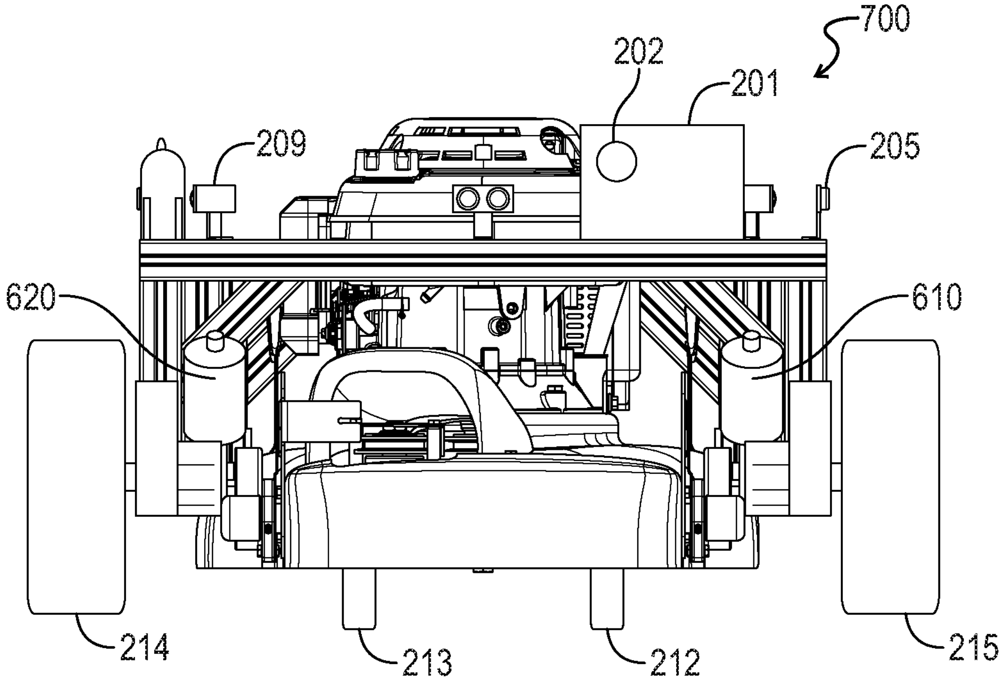
FIG. 6 is a diagram illustrating a back view of the retrofitted lawn mower system depicted by FIG. 5.

To facilitate connection of the vertical arms 216-219 to the lawn mower 110, each vertical arm 216-219 has a tab 245, and each tab 245 has a hole for receiving a component of the lawnmower 110. When retrofitting the lawn mower 110, a user may remove the wheels 113 (FIG. 1) and the push bar 114 (FIG. 1), as shown by FIG. 4. The removal of a wheel 113 exposes a corresponding axle 146 on which the wheel 113 was originally mounted. This axle 146 may be inserted into a hole of tab 245 for a corresponding vertical arm 216-219 in order to secure the lawn mower 110 to such arm 216-219. In other embodiments, other techniques for securing the lawn mower 110 to the frame 220 are possible, and the support frame 220 may connect to other points of the lawn mower 110 in addition to or in lieu of the wheel axles 146.

As shown by FIG. 2, the retrofit assembly 150 also has a control box 201, an emergency stop button 202, ultrasonic sensors 203-209, a battery 210, a bumper sensor 211, a plurality of front wheels 212, 213, a plurality of rear wheels 214, 215, and a linear actuator 242. In other embodiments, the retrofit assembly 150 may have other combinations and numbers of components.

The control box 201 defines a housing that houses a controller 1000 (FIG. 10) and at least one motor (not shown in FIG. 2) for driving one or more wheels of the assembly 150. The controller 1000 within the control box 201 is communicatively (e.g., electrically, optically or wirelessly) coupled to the emergency stop button 202, ultrasonic sensors 203-209, battery 210, bumper sensor 211, and the linear actuator 242. In some embodiments, control box 201 houses at least one electric motor (not shown in FIG. 2) for driving the rear wheel 215 and at least one electric motor (not shown in FIG. 2) for driving the rear wheel 215. The electric motors, operating under control of the controller 1000, may differentially drive the wheels 214, 215 to steer the retrofit assembly 150 as may be desired. As an example, to turn the retrofit assembly 150 in a desired direction, one of the rear wheels 214, 215 may be rotated at a faster or slower speed than the other rear wheel to achieve the desired turn direction and rate. In the embodiment shown by FIG. 2, the front wheels 212, 213 are implemented as swivel caster wheels that swivel in order to facilitate turning induced by differentially driving the rear wheels 214, 215. However, in other embodiments, other types of wheels and other techniques for steering the retrofit assembly 150 are possible.

In some embodiments, as will be described in more detail below, the controller 1000 housed by the control box 201 is configured to autonomously or semi-autonomously control the movement of the retrofit assembly 150 by controlling the motors driving the rear wheels 214, 215. The ultrasonic sensors 203-209 and bumper sensor 211 can give warnings to the controller 1000 regarding obstacles in the path of the retrofit assembly 150. As an example, in response to a detection by the ultrasonic sensors 203-209 or bumper sensor 211 of an obstacle in a path of the retrofit assembly 150, the controller 1000 may automatically steer the retrofit assembly 150 around the obstacle. Optionally, the controller 1000 may be configured to trigger an emergency shutoff in response to the bumper sensor 211 sensing contact with an obstacle. During an emergency shutoff, the controller 1000 may stop rotation of the wheels 214, 215 to prevent further movement of the retrofit assembly 150 and also control the engine 112 of the lawn mower 110 to stop rotation of the cutting blade within housing 111.

Note that, to enable the controller 1000 to control the engine 112, the linear actuator 242 may be interfaced with the operator presence cable (not shown) of the lawn mower 110 and actuate such cable under the control of the controller 1000 to cause the engine 112 to shutoff or otherwise stop rotation of the cutting blade. Other actuators or solenoids may be used for the same purpose, or to interface with other lawn mower controls such as a lawn mower throttle. The lawn mower control cables attached to the actuators may run through eyehooks or pulleys so pulling and releasing of cables or wires occur at a suitable angle. If the lawn mower 110 has an electrical interface (not shown) for receiving control inputs for the engine 112, then the controller 1000 in the control box 201 may be electrically coupled to such interface to provide the desired control inputs. In other embodiments, other techniques may be used for communicating control inputs (e.g., optical or wireless) or otherwise controlling the operation of the engine 112.

The battery 210 provides power to the other electrical components of the retrofit assembly 150, such as the controller 1000 and the motors in the control box 201 and sensors 203-209, 211. The frame 220 may be constructed from T-slot extruded aluminum to allow for modularity and adjustability between different size mowers and other similar yard machinery, as will be described in more detail below. The frame 220 may have other shapes and materials in other embodiments.

Figure 3:
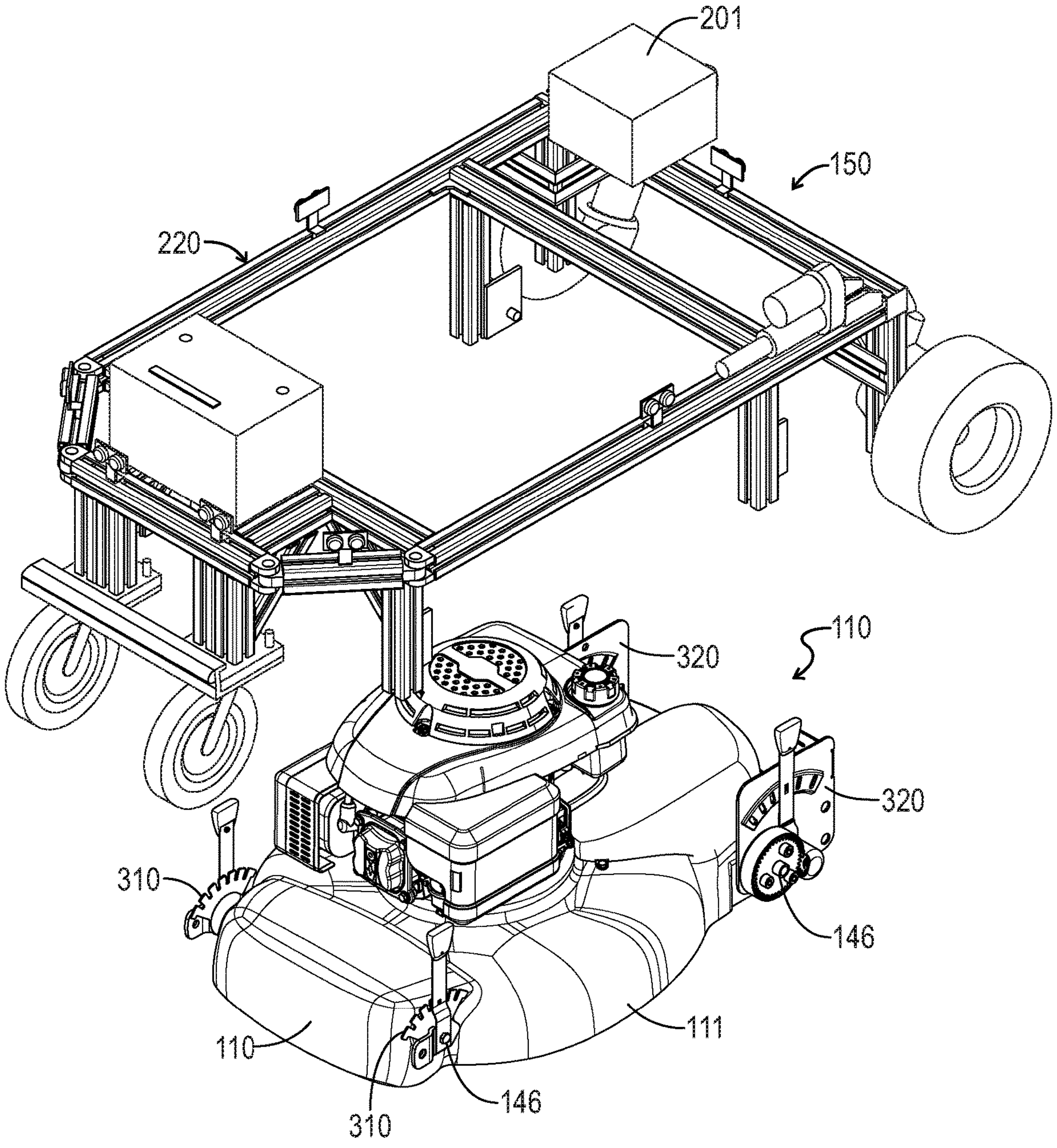
FIG. 3 is a diagram illustrating the retrofit assembly of FIG. 2 and the push lawn mower of FIG. 4 during a process of connecting the retrofit assembly to the push lawn mower.

As noted above, when the lawn mower 110 is being retrofitted with the assembly 150, the wheels 113 and push bar 114 of the lawn mower 110 may be removed, as shown by FIG. 4, and the support frame 220 is arranged to fit over and connect to the lawn mower 110 as seen in FIGS. 3 and 5-7. FIG. 3 depicts an exemplary embodiment of a support frame 220 for retrofitting a push lawn mower 200 suspended over the lawn mower 110 as the frame 220 is being positioned for connection to the lawn mower 110. The front height adjustment mechanisms 310 for front wheels 113 and the rear height adjustment mechanisms 320 for the rear wheels 113 are shown. Each height adjustment mechanism 310, 320 may be manually adjusted to raise or lower the housing 111 and, hence, the cutting blade within the housing 111, relative to the corresponding wheel 313 to which the mechanism 310, 320 is coupled, thereby changing the cutting height for the cutting blade (i.e., the height on the grass blade at which the blade cuts). By connecting the support frame 220 to the lawn mower 110 at the wheel axles 146 exposed by removal of the mower wheels 113, the height adjustment mechanisms 310, 320 may be manipulated in the same way as prior to the retrofit to raise or lower the housing 111 and, hence, cutting blade within the housing 111, relative to the retrofit frame 220, thereby changing the cutting height for the cutting blade.

Figure 7:
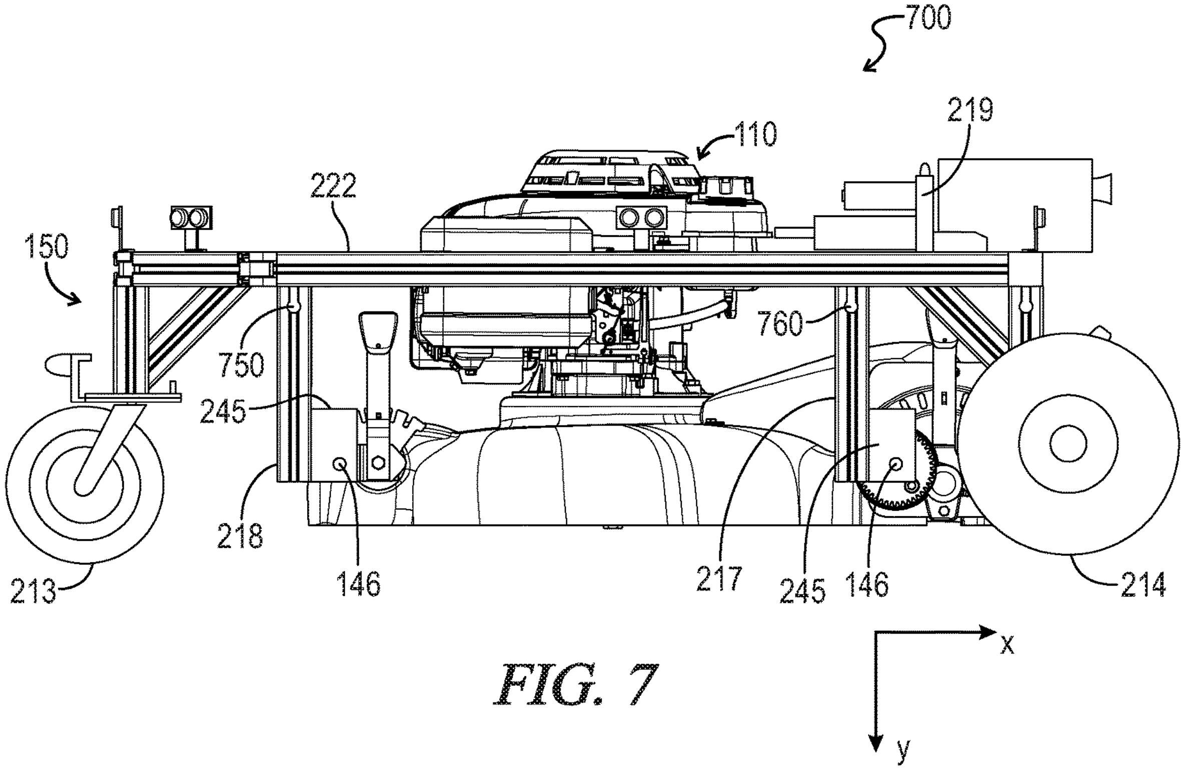
FIG. 7 is a diagram illustrating a side view of the retrofitted lawn mower system depicted by FIG. 5.

FIG. 7 shows a side view of a retrofitted lawn mower system 700 having a conventional lawn mower 110 connected to the retrofit assembly 150. As noted above, each of the vertical arms 217, 218 may have a tab 245 that is interfaced with a respective axle 146 of the lawn mower 110. In this regard, the corresponding axle 146 interfaced with a tab 245 passes through a hole in the tab 245 so that the tab 245 holds the axle 146. If desired, a nut may be screwed onto the axle 146 and press against the tab 245 to help secure the axle 146 to the tab 245. Locking tabs 750, 760 lock vertical arms 218, 217 respectively, thereby helping to prevent horizontal movement of the vertical arms 218, 217 in the x-direction relative to the rest of the frame 220, including in particular the horizontal support element 222.

As noted above, the control box 201 may house various components such as the controller 1000 and motors for driving one or more wheels of the retrofit assembly 150. In some embodiments, the control box 201 may house a location sensor 940 (FIG. 9), such as global positioning system (GPS) sensor, for sensing a location of the retrofit assembly 150. The control box 201 may also house a communication interface 910 (FIG. 9) for enabling the controller 1000 to communicate wirelessly with external devices or systems. As an example, the communication interface 910 may comprise a radio frequency (RF) transceiver, but other types of communication devices are possible in other embodiments.

In some embodiments, the location sensed by the system 700 may be improved via communication with a local point that serves as a reference for use in determining the location of the system 700. As an example, a stationary node 820 (FIG. 8) may be positioned in close proximity of the system 700. The controller 1000 may take a reading of the location sensor 940, and the location of the node 820 may be known by the controller 1000. As an example, if the location sensor 940 is a GPS sensor, the controller 1000 may determine the GPS location of the system 700 based on a signal from a GPS satellite 810. The controller 1000 may also communicate wirelessly with the stationary node 820 to determine a distance between the system 700 and the node 820, using time-of-flight or some other algorithm for determining distance. Based on this distance and the known location of the node 820, the controller 1000 may refine or otherwise adjust the GPS measurement to provide a more accurate measurement of the system's actual location. In some embodiments, the stationary node 820 may be configured to calculate the location of the system 700 based on a GPS signal from a GPS satellite 810 and a wireless signal from the system 700. As an example, the stationary node 820 may employ a known algorithm, such as RTK GPS, in order to determine an accurate location of the system 700. Regardless of the algorithm used by the node 820 to determine the system's location, the node 820 may be configured to wirelessly report location measurements to the controller 1000. In other embodiments, other techniques for determining the location of the system 700 are possible.

If desired, the communication interface 910 may be configured to communicate wirelessly with a remote communication device (not shown). As an example, a user may use the remote communication device to provide remote control signals for controlling the operation of the retrofit assembly 150, such as steering the retrofit assembly 150 when operating in a semi-autonomous embodiment. In other examples, other input may be received wirelessly, such as when to commence or stop cutting operations. As an example, the remote communication device may have a safety switch that, when activated by a user, causes the remote communication device to transmit a control input instructing the controller 1000 to stop one or more operations, such as rotation of the cutting blade and/or movement of the system 700. In some embodiments, the safety switch may be designed such that operation of the system 700 is permitted only while the safety switch is being actively depressed by the user. Thus, if the user releases the safety switch for any reason, then movement of the system 700 and rotation of the cutting blade ceases, as described above.

In some embodiments, the remote communication device may display a map of the grounds with an overlay indicating the boundaries of the area to mow. The remote communication device mays also display the lawn mower's position on the map and orientation may also be indicated, along with indications on the map of the area mowed and the area left to mow. The user may view such display and provide inputs for steering the system 700 as may be desired to mow the areas that have yet to be mowed. In some embodiments, a smart phone may be used as the remote communication device, but other types of remote communication devices may be used in other embodiments, such as desktop or laptop computers.

After retrofitting the lawn mower 110 with the retrofit assembly 150, the user can execute a training mode to allow the system 700 to learn the boundaries of the property to be mowed. As an example, the user may provide inputs via the remote communication device to steer the system 700 along the boundary of the lawn to be mowed. During this procedure, the controller 1000 may use the location sensor 940 to track and record the locations of the system 700. Thus, after the training procedure, the controller 1000 is aware of the area to be mowed as defined by the boundary of the lawn learned during the training procedure. Thereafter, the controller 1000 may autonomously control the system 700 to mow the area within the indicated boundary such that user does not need to provide real time inputs for steering or otherwise controlling the motion of the system 700.

Figure 8:
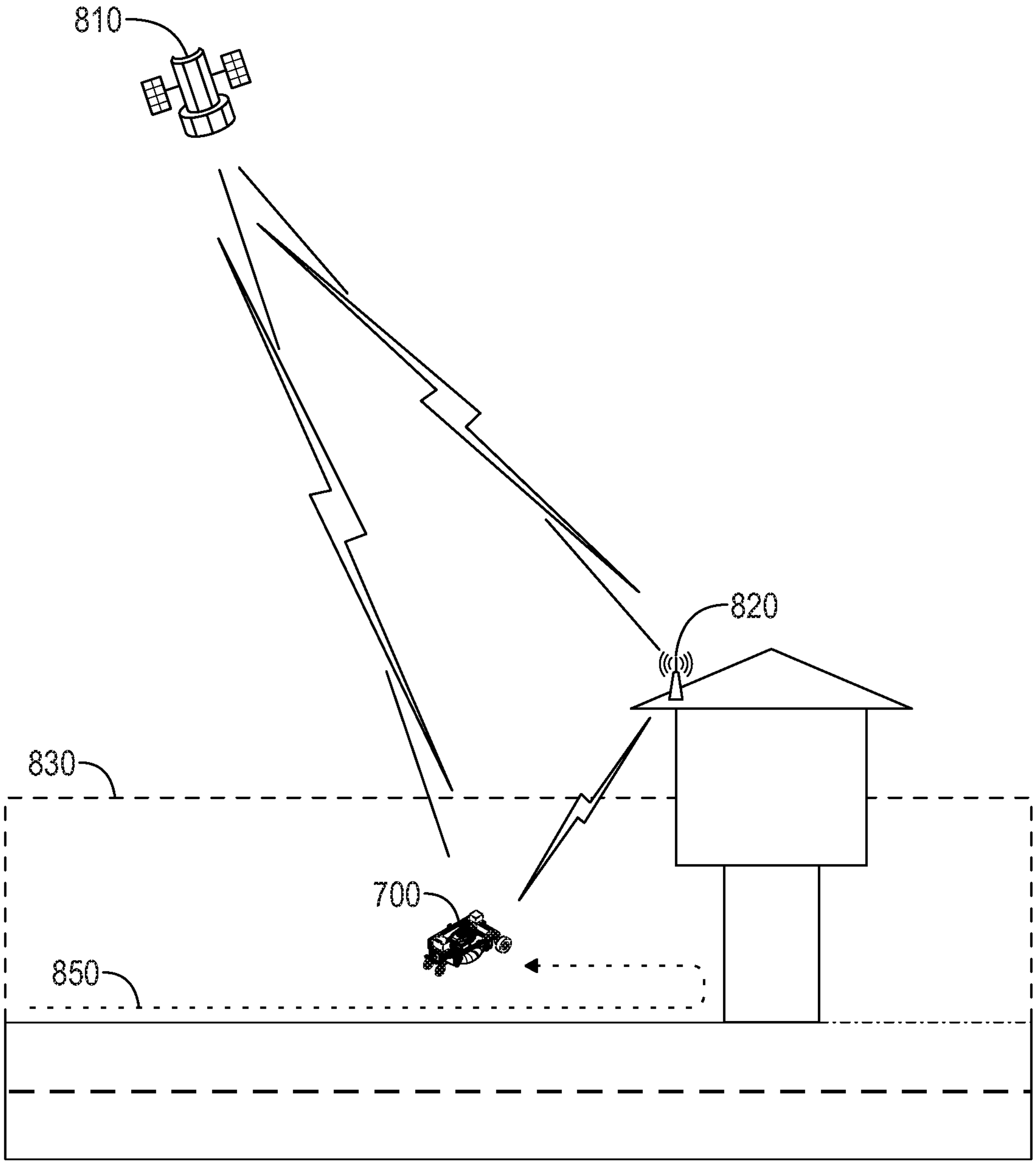
FIG. 8 is a diagram illustrating a retrofitted lawn mower system, such as is depicted by FIG. 5, in use for mowing a lawn.

FIG. 8 illustrates an exemplary embodiment in which the system 700 is to be used to mow grass inside of a boundary 830. As described above, the controller 1000 may be configured to store data indicative of the boundary 830, which may be used by the controller 1000 to autonomously steer the system 700 within the boundary 830. In this regard, the controller 1000 may select a path 850 within the boundary 830 and then control the motors for driving the rear wheels 214, 215 so that the system 700 follows the selected path 850 while also mowing grass. Moreover, one or more paths may be selected until all of the grass within the defined boundary 830 is mowed. During mowing, the system 700 may be configured to detect obstacles, as described above, and adjust the system's path to avoid the detected obstacles.

It should be emphasized that the embodiments described above are exemplary, and various changes or modifications to the described embodiments are possible. As an example, the configuration of the support frame 220 and the shapes of the individual support elements 221-228 may be different than those described above. In this regard, although the support elements 221-228 have generally been shown to be straight, it is possible for any support element 221-228 to be curved or otherwise have a shape that is different than the one shown. In addition, it is unnecessary for the vertical arms 216-219 to have tabs 245, and the axles 165 (or other components) of the lawn mower 110 may be connected to other portions of the vertical arms 216-219 or to other support elements. In addition, it is possible for a single motor to drive the wheels of the assembly 150 used to move and steer the assembly 150.

Further, it should be noted that the lawn mower 110 may have an axle 146 for each wheel 113 or any axle 146 may be coupled to multiple wheels 113. As an example, in the embodiment described above for which the vertical arms 216-219 are connected to axles 146, it is possible for each vertical arm 216, 217 to be connected to two different axles 146 or the same axle 146. As an example, the mower 110 may have a rear axle that extends from one side of the mower 110 to the other for connection to two wheels 113 on opposite sides of the mower 110. For such an axle, the vertical arm 216 may be coupled to one end of an axle 146, and the vertical arm 217 may be connected to the other end of the same axle 146. Similarly, the vertical arms 218, 219 may be coupled to two different axles or the different ends of the same axle 146.

Figure 9:
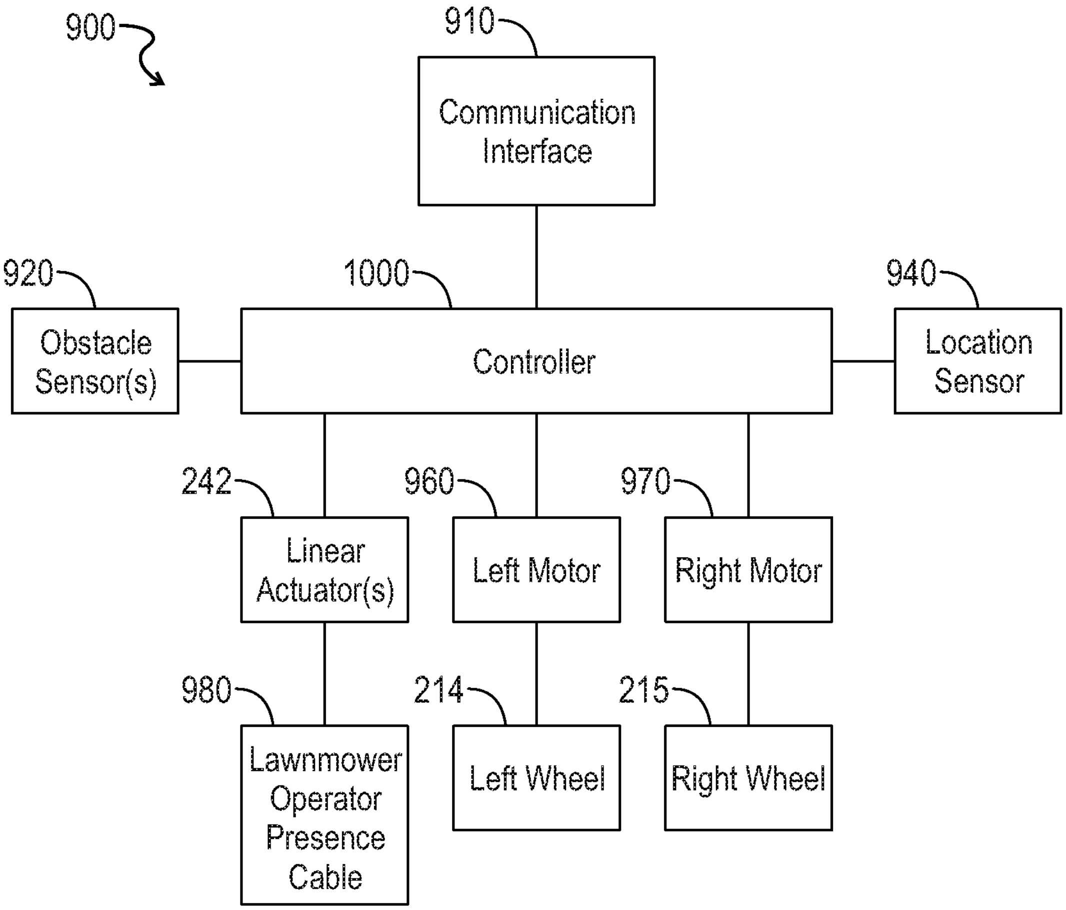
FIG. 9 is a block diagram illustrating an exemplary control system for controlling the retrofitted lawn mower system, such as is depicted by FIG. 5.

FIG. 9 shows a block diagram of an exemplary control system 900 for the retrofit assembly 150. A controller 1000 is connected to communications interface 910, such as one or more RF transceivers, allowing the controller 1000 to communicate with a remote communication device (not shown). The location sensor 940 measure a location of the system 700 and provides the location measurements to the controller 1000. Obstacle sensors 920, such as ultrasonic sensors 201-209 and/or bumper sensor 211, detect external objects in a vicinity of the assembly 150 and provide data indicative of such objects (e.g., size and location) to the controller 1000. The controller 1000 is in communication with and controls a left motor 960 that drives the left rear wheel 214 and a right motor 970 that drives the right rear wheel 215. The controller 1000 also controls one or more linear actuators 242, which may control among other things a lawn mower's operator presence cable 980 and optionally other lawn mower controls, such as the lawn mower's throttle (not shown).

Figure 10:
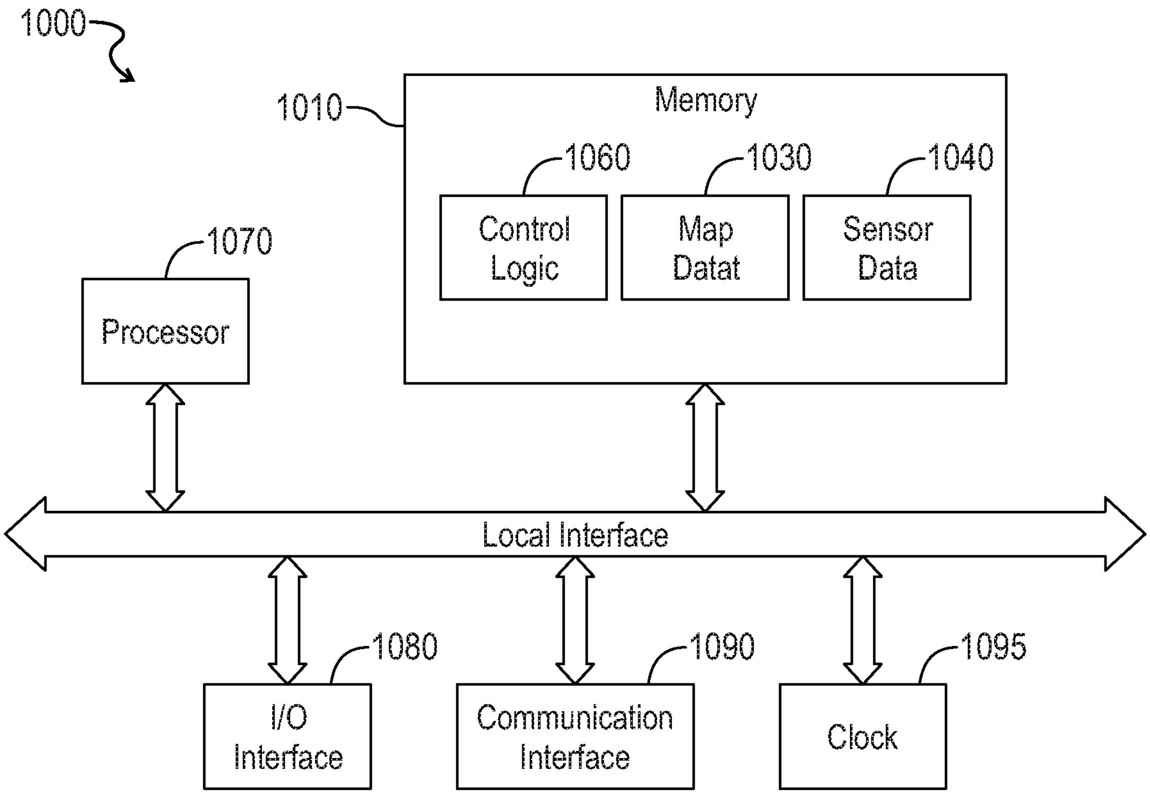
FIG. 10 is a diagram illustrating an exemplary embodiment of a controller, such as is depicted by FIG. 9, for use in controlling a retrofitted lawn mower system, such as is depicted by FIG. 5.

FIG. 10 is an exemplary embodiment of the controller 1000. As shown by FIG. 10, the controller 1000 may comprise at least one processor 1070, memory 1010, input and/or output (I/O) interface 1080, and a clock 1095, and the processor 1070 may be electrically coupled to these components through a local interface 1080, which may include one or more buses.

The memory 1010 may store sensor data 1040 from the system's sensors 201-209, 211 and map data 1030 indicative of the boundaries of the area to be mowed. As shown by FIG. 10, the controller 1000 may have control logic 1060 for generally controlling the operation of the controller 1000, as described above. The control logic 1060 may be implemented in hardware, software, or any combination thereof. In the exemplary embodiment shown by FIG. 10, the control logic 1060 is implemented in software and stored in memory 1010.

The above described embodiments are presented for purposes of illustration and not of limitation. The present disclosure also can take many forms other than those explicitly described herein. The order may be rearranged or elements may be replaced with compatible alternatives without taking away from the spirit of the disclosure. Accordingly, it is emphasized that this disclosure is not limited to the explicitly disclosed methods, systems, and apparatuses, but is intended to include variations to and modifications thereof, which are within the spirit of the following claims.

The following is claimed:

1. A system, comprising:

a push lawn equipment having a plurality of axles for wheels of the push lawn equipment, the plurality of axles including at least a first axle and a second axle; and a retrofit assembly for retrofitting the push lawn equipment for autonomous or semi-autonomous control, the retrofit assembly comprising:

a support frame coupled to the push lawn equipment at the first axle, the support frame having a plurality of interconnected support elements, including at least a first support element and a second support element, wherein the first support element has a first hole through which the first axle passes;

a plurality of wheels coupled to the support frame;

at least one motor mounted on the support frame and coupled to the plurality of wheels for driving the plurality of wheels; and a controller mounted on the support frame and configured to control the at least one motor for moving and steering the support frame, wherein the second support element has a first groove, wherein the first support element is inserted into the first groove, and wherein the first support element is movable relative to the second support element for accommodating a size of the push lawn equipment by sliding along the second support element in the first groove.

2. The system of claim 1, wherein the plurality of interconnected support elements includes a third support element having a second groove, wherein the first support element is inserted into the second groove, and wherein the first support element is movable relative to the third support element by sliding along the third support element in the second groove.

3. The system of claim 1, wherein the first support element has a first arm and a second arm, wherein the first arm has the first hole through which the first axle passes, and wherein the second arm has a second hole through which the first axle passes.

4. The system of claim 1, wherein the at least one motor comprises a first motor for driving a wheel of the plurality of wheels and a second motor for driving a wheel of the plurality of wheels, and wherein the controller is configured to control the first motor and the second motor for differentially driving the plurality of wheels, thereby moving and turning the system.

5. The system of claim 1, wherein the push lawn equipment is a push lawn mower.

6. A retrofit assembly for retrofitting push lawn equipment for autonomous or semi-autonomous control, comprising:

a support frame configured to connect to the push lawn equipment at a first axle for a first wheel of the lawn equipment, wherein the support frame has a plurality of interconnected support elements, including at least a first support element and a second support element, wherein the second support element has a first groove, wherein the first support element is inserted into the first groove, and wherein the first support element is movable relative to the second support element for accommodating a size of the push lawn equipment by sliding along the second support element in the first groove;

a plurality of wheels coupled to the support frame;

at least one motor mounted on the support frame and coupled to the plurality of wheels for driving the plurality of wheels; and a controller mounted on the support frame and configured to control the at least one motor for moving and steering the support frame.

7. The retrofit assembly of claim 6, wherein the first support element has a first hole for receiving the first axle.

8. The retrofit assembly of claim 6, wherein the plurality of interconnected support elements includes a third support element having a second groove, wherein the first support element is inserted into the second groove, and wherein the first support element is movable relative to the third support element by sliding along the third support element in the second groove.

9. The retrofit assembly of claim 6, wherein the at least one motor comprises a first motor for driving a wheel of the plurality of wheels and a second motor for driving a wheel of the plurality of wheels, and wherein the controller is configured to control the first motor and the second motor for differentially driving the plurality of wheels, thereby moving and turning the support frame.

10. The retrofit assembly of claim 6, wherein the push lawn equipment is a push lawn mower.

11. A method for retrofitting push lawn equipment for autonomous or semi-autonomous control, comprising:

removing a first wheel from at least one axle of the push lawn equipment;

removing a second wheel from the at least one axle of the push lawn equipment;

securing a support frame of a retrofit assembly to the at least one axle, wherein the support frame has a plurality of interconnected support elements, including at least a first support element and a second support element, wherein the securing comprises inserting the at least one axle through a first hole of the first support element;

moving the first support element relative to the second support element thereby accommodating a size of the push lawn equipment;

driving a plurality of wheels coupled to the support from with at least one motor mounted on the support frame; and controlling the at least one motor with a controller mounted on the support frame such that the support frame and the push lawn equipment are moved and steered by rotation of the wheels, wherein the second support element has a first groove, wherein the first support element is inserted into the first groove, and wherein the moving comprises sliding the first support element along the second support element in the first groove.

12. The method of claim 11, wherein the plurality of interconnected support elements includes a third support element having a second groove, wherein the first support element is inserted into the second groove, and wherein the moving comprises sliding the first support element along the third support element in the second groove.

13. The method of claim 11, wherein the first support element has a first arm and a second arm, wherein the securing comprises:

inserting the at least one axle through a first hole of the first arm; and inserting the at least one axle through a second hole of the second arm.

14. The method of claim 11, wherein the driving comprises:

driving a wheel of the plurality of wheels with a first motor; and driving a wheel of the plurality of wheels with a second motor, wherein the controlling comprises controlling the first motor and the second motor to differentially drive the plurality of wheels, thereby moving and turning the support frame and the push lawn equipment.

15. The method of claim 11, wherein the push lawn equipment is a push lawn mower.

* * * * *